(12) United States Patent
Huynh

(10) Patent No.: US 8,395,288 B2
(45) Date of Patent: Mar. 12, 2013

(54) ELECTRIC MACHINE WITH CENTRIFUGAL IMPELLER

(75) Inventor: Andrew Co Si Huynh, Brea, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 297 days.

(21) Appl. No.: 11/524,690

(22) Filed: Sep. 21, 2006

(65) Prior Publication Data

US 2007/0063594 A1    Mar. 22, 2007

Related U.S. Application Data

(60) Provisional application No. 60/719,542, filed on Sep. 21, 2005.

(51) Int. Cl.
*H02K 9/00* (2006.01)
(52) U.S. Cl. .............................. 310/59; 310/52
(58) Field of Classification Search .................. 310/52, 310/54, 57, 59, 62–63, 254, 261
See application file for complete search history.

(56) References Cited

U.S. PATENT DOCUMENTS

| | | | |
|---|---|---|---|
| 1,269,537 A | | 6/1918 | Holcombe |
| 2,276,695 A | | 3/1942 | Lavarello |
| 2,465,761 A | | 3/1949 | Staude |
| 2,742,582 A | | 4/1956 | Bahn |
| 2,917,636 A | | 12/1959 | Akeley |
| 2,920,218 A | | 1/1960 | Beckwith |
| 3,060,335 A | * | 10/1962 | Greenwald ............... 310/54 |
| 3,064,942 A | | 11/1962 | Martin |
| 3,439,201 A | * | 4/1969 | Levy et al. ............... 310/52 |
| 3,439,202 A | | 4/1969 | Wanke |
| 3,751,699 A | | 8/1973 | Gleichman |
| 3,809,934 A | | 5/1974 | Baer |
| 4,170,435 A | | 10/1979 | Swearingen |
| 4,341,151 A | | 7/1982 | Sakamoto |
| 4,348,604 A | | 9/1982 | Thode |
| 4,362,020 A | | 12/1982 | Meacher et al. |

(Continued)

FOREIGN PATENT DOCUMENTS

| | | |
|---|---|---|
| DE | 102006004836 A1 | 5/2007 |
| EP | 1905948 | 4/2008 |

(Continued)

OTHER PUBLICATIONS

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

(Continued)

*Primary Examiner* — Thanh Lam
(74) *Attorney, Agent, or Firm* — Fish & Richardson P.C.

(57) ABSTRACT

An electrical machine having a centrifugal compressor for producing a fluid flow to cool one or more portions thereof. In one embodiment, the fluid is separated into separate flows, each of the flows flowing through only a portion of an annular gap formed between a rotor and stator of the electrical machine. According to some embodiments, the centrifugal compressor pushes a fluid through the electrical machine, whereas, in other embodiments, the centrifugal compressor pulls the fluid through the electrical machine. The centrifugal compressor includes an impeller that is attached to a shaft of the rotor. According to other embodiments, the electrical machine may include longitudinal channels formed between a housing of the electrical machine and the stator. A first flow of the fluid travels through the annular gap, and a second flow travels through the longitudinal channels. The electrical machine may also include a damper disposed in the longitudinal channels.

42 Claims, 6 Drawing Sheets

U.S. PATENT DOCUMENTS

| | | | |
|---|---|---|---|
| 4,415,024 | A | 11/1983 | Baker |
| 4,443,723 | A | 4/1984 | Ohkubo |
| 4,544,855 | A | 10/1985 | Prenner et al. |
| 4,635,712 | A | 1/1987 | Baker et al. |
| 4,740,711 | A | 4/1988 | Sato et al. |
| 5,083,040 | A | 1/1992 | Whitford et al. |
| D325,080 | S | 3/1992 | Wortham |
| 5,481,145 | A | 1/1996 | Canders et al. |
| 5,514,924 | A | 5/1996 | McMullen et al. |
| 5,559,379 | A | 9/1996 | Voss |
| 5,627,420 | A * | 5/1997 | Rinker et al. .................. 310/87 |
| 5,640,064 | A | 6/1997 | Boyd, Jr. et al. |
| 5,668,429 | A | 9/1997 | Boyd, Jr. et al. |
| 5,672,047 | A | 9/1997 | Birkholz |
| 5,852,338 | A | 12/1998 | Boyd, Jr. et al. |
| 5,894,182 | A | 4/1999 | Saban et al. |
| 5,911,453 | A | 6/1999 | Boyd, Jr. et al. |
| 5,942,829 | A | 8/1999 | Huynh |
| 5,990,588 | A | 11/1999 | Kliman et al. |
| 5,994,804 | A * | 11/1999 | Grennan et al. ............ 310/60 R |
| 6,002,191 | A | 12/1999 | Saban |
| 6,018,207 | A | 1/2000 | Saban et al. |
| 6,087,744 | A * | 7/2000 | Glauning ........................ 310/58 |
| 6,088,905 | A | 7/2000 | Boyd, Jr. et al. |
| 6,148,967 | A | 11/2000 | Huynh |
| 6,167,703 | B1 | 1/2001 | Rumez et al. |
| 6,191,511 | B1 * | 2/2001 | Zysset ........................ 310/60 A |
| 6,223,417 | B1 | 5/2001 | Saban et al. |
| 6,270,309 | B1 | 8/2001 | Ghetzler et al. |
| 6,324,494 | B1 | 11/2001 | Saban |
| 6,325,142 | B1 | 12/2001 | Bosley et al. |
| 6,388,356 | B1 | 5/2002 | Saban |
| D459,796 | S | 7/2002 | Moreno |
| 6,437,468 | B2 * | 8/2002 | Stahl et al. ...................... 310/61 |
| 6,504,337 | B1 | 1/2003 | Saban et al. |
| 6,663,347 | B2 | 12/2003 | Decker et al. |
| 6,664,680 | B1 | 12/2003 | Gabrys |
| 6,700,258 | B2 | 3/2004 | McMullen et al. |
| 6,727,617 | B2 | 4/2004 | McMullen et al. |
| 6,777,847 | B1 | 8/2004 | Saban et al. |
| 6,897,587 | B1 | 5/2005 | McMullen et al. |
| 6,934,666 | B2 | 8/2005 | Saban et al. |
| 6,967,461 | B1 | 11/2005 | Markunas et al. |
| 7,042,118 | B2 | 5/2006 | McMullen et al. |
| 7,075,399 | B2 | 7/2006 | Saban et al. |
| 7,208,854 | B1 | 4/2007 | Saban et al. |
| 2003/0074165 | A1 | 4/2003 | Saban et al. |
| 2004/0027011 | A1 | 2/2004 | Bostwick et al. |
| 2004/0189429 | A1 | 9/2004 | Saban et al. |
| 2005/0093391 | A1 | 5/2005 | McMullen et al. |
| 2007/0018516 | A1 | 1/2007 | Pal et al. |
| 2007/0056285 | A1 | 3/2007 | Brewington |
| 2007/0200438 | A1 * | 8/2007 | Kaminski et al. ............... 310/54 |
| 2008/0103632 | A1 | 5/2008 | Saban et al. |
| 2008/0224551 | A1 | 9/2008 | Saban et al. |
| 2008/0246373 | A1 | 10/2008 | Filatov |
| 2008/0252077 | A1 | 10/2008 | Myers |
| 2009/0004032 | A1 | 1/2009 | Kaupert |

FOREIGN PATENT DOCUMENTS

| | | |
|---|---|---|
| GB | 2225813 | 6/1990 |
| JP | 63129839 | 6/1988 |
| JP | 63277443 | 11/1988 |
| JP | 2001078390 | 3/2001 |
| WO | 03/100946 | 12/2003 |
| WO | WO 03/100946 | 12/2003 |

OTHER PUBLICATIONS

Ormat Web Site: "Recovered Energy Generation in the Cement Industry," (2 pages) available at http://www.ormat.com/technology_cement_2.htm, printed Jul. 26, 2006.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Freepower ORC Electricity Company Home Page, "Welcome to Freepower," (1 page) available at http://www.freepower.co.uk/, Jul. 18, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Overview "A System Overview," (1 page), available at http://www.freepower.co.uk/tech-overview.htm, 2000-2006, printed Jul. 26, 2006.

Freepower FP6,. "Freepower FP6 Specification & Dimensions for 6kWe Electricity Generating Equipment," (2 pages), 2000-2004, printed Jul. 26, 2006.

Honeywell, "Genetron® 245fa Applications Development Guide," (15 pages), 2000.

International Search Report and Written Opinion of the International Searching Authority issued in International Application No. PCT/US2008/060227 on Oct. 28, 2008; 12 pages.

File History for U.S. Appl. No. 12/049,117, entitled "Cooling an Electrical Machine" filed Mar. 14, 2008 (Total 135 pages), published as U.S. Patent Application Publication No. 2008/0224551, as of Aug. 11, 2009.

File History for U.S. Appl. No. 11/735,839, entitled "Generating Energy From Fluid Expansion" filed Apr. 16, 2007 (Total 410 pages), published as U.S. Patent Application Publication No. 2008/0252077, as of Aug. 11, 2009.

Notification of Transmittal of the International Search Report and the Written Opinion of the International Searching Authority, or the Declaration (2 pages), International Search Report (4 pages), and Written Opinion of the International Searching Authority (6 pages) in international application PCT/US2008/057082, dated Jul. 8, 2008.

Notification of Transmittal of the International Preliminary Report on Patentability (1 page) and International Preliminary Report on Patentability (10 pages) in international application PCT/US2008/057082, dated Mar. 16, 2009.

International Preliminary Report on Patentability issued in International Application No. PCT/US2008/060227; Jun. 17, 2009; 11 pages.

Cassandra Bailey et al., "Design of High-Speed, Direct-Connected, Permanent-Magnet Motors and Generators for the Petrochemical Industry" IEEE, 2007 (5 pages).

Cassandra Bailey et al., "Design of High-Speed Direct-Connected Permanent-Magnet Motors and Generators for the Petrochemical Industry" IEEE Transactions on Industry Applications, vol. 45, No. 3, May/Jun. 2009, pp. 1159-1165.

Agreement for the Development and Supply of Goods and Services—TM1800 High Speed Alternator and Electric Unit, effective Nov. 28, 2002, 50 pages (hereinafter "Agreement").

Presentation for HSA (High Speed Alternator) Critical Design prepared by Calnetix Innovative Magnetic Technologies related to the Agreement, 75 pages.

Engineering drawings of TM1800 High Speed Alternator and Electric Unit prepared by Direct Drive Systems pursuant to work for the Agreement, representative of a machine related to the Agreement, 2 pages.

Solid model drawing of TM1800 High Speed Alternator and Electric Unit prepared pursuant to work for the Agreement, 1 page.

* cited by examiner

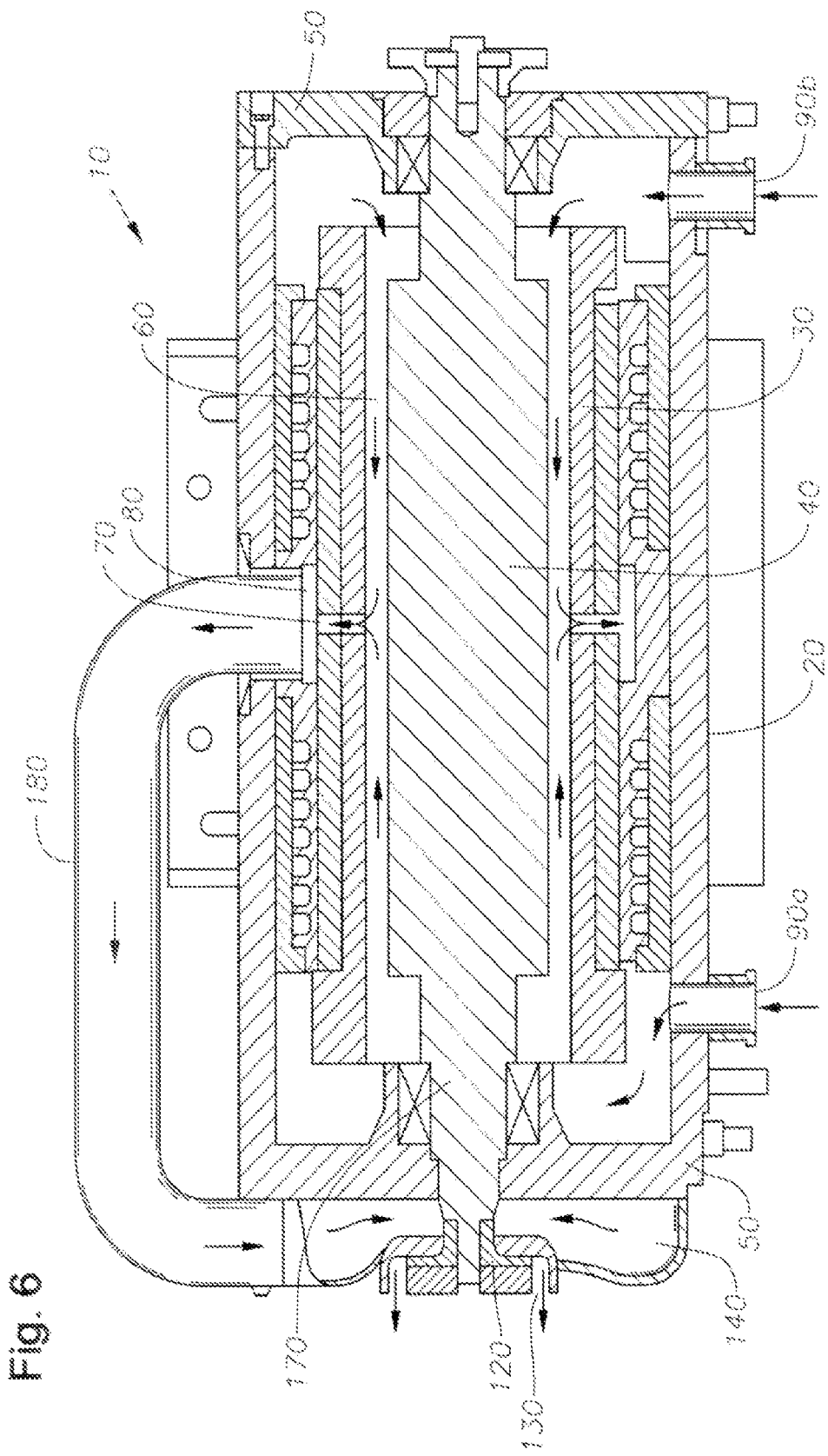

ELECTRIC MACHINE WITH CENTRIFUGAL IMPELLER

CROSS-REFERENCE TO RELATED APPLICATIONS

This application claims the benefit of U.S. Provisional Application No. 60/719,542 filed Sep. 21, 2005, the entirety of which is hereby incorporated by reference.

BACKGROUND

This invention relates to electric machines and systems related thereto, and more particularly to cooling one or more components of the electrical machines.

In an electrical machine, such as a motor and/or generator, the stator and the rotor are subject to resistive loss heating, inductive heating from eddy currents, hysteresis, and aerodynamic heating caused by the friction of air or gas present in the gap between the rotor and the stator. The bearings are also subject to friction heating. In certain applications, the rotor, stator, and bearings may be subjected to heating from thermal conduction or "soak back" from the actuator or prime mover that is connected to the machine.

It is desirable to maintain temperatures within the electrical machine within specified ranges to prevent deleterious effects caused by excessive temperatures, such as, for example, insulation breakdown, excessive expansion leading to rubbing or imbalance, yield failure or creep, cyclic fatigue, bearing failure, and damage to or demagnetization of permanent magnet materials. Moreover, high speed electrical machines, i.e., electrical machines operating at speeds above 3,600 revolutions per minute ("RPM") compared to conventional electrical machines operating at speeds between 1,800 and 3,600 RPM, have power densities, by both volume and weight, much higher than conventional electrical machines. As a result, heat generated by high speed electrical machines is more concentrated in a smaller volume or surface compared to conventional electrical machines.

Methods using fans and air or other gas or liquid coolants provided from an external source have been used to provide cooling to electrical machines. However, in the context of high speed electrical machines, such cooling methods do not provide a reasonable technical and cost effective cooling solution. Particularly, in order to cool high speed electrical machines, a large pressure head is generally necessary due to small volume and small gaps between the rotor and the stator. Fans presently utilized to cool electrical machines become a heat source when operated at high speeds and, therefore, exacerbate the cooling problem associated with high speed electrical machines, especially when it is required to generate large pressure head.

Utilizing multiple fans in a back-to-back configuration are not a cost effective solution for industrial electrical machines. External sources for providing gas or liquid coolants to cool high speed electrical machines also add cost and complexity. Consequently, there is a need in the art to cool various components of electrical machines, such as, for example, stators, rotors, and bearings, in a simple and relatively inexpensive manner so that the electrical machines will remain within a specified temperature range.

SUMMARY

The present disclosure encompasses systems and methods for cooling electric machines and systems related thereto. Certain embodiments address the above-described problem by reducing pressure head needed to conduct a fluid to cool an electric machine, such as, for example, via a route by which the fluid travels through the electrical machine and the use of a more efficient centrifugal impeller attached to a shaft of the electrical machine.

In certain embodiments, a centrifugal impeller is driven directly by a shaft of an electrical machine. In some instances, the impeller may be used to provide a pressurized source of a gas (e.g., air, hydrogen, vapor, nitrogen, or combinations of these or other fluids). Certain embodiments direct fluid to cool the same machine, including surfaces near the air gap between the rotor and stator. In certain embodiments, the centrifugal impeller is coupled to a shaft of the electrical machine that may be operated at high rotational speeds, including speeds greater than 3,600 RPM.

In certain embodiments, the fluid may be distributed to the machine at one or more inlets. The general flow may be axial, radial, tangential (circumferential), or a combination thereof. All or a portion of the air flow may be directed to pass through or around the air gap, one or more bearings, portions of the shaft, the stator, the windings, and/or other components for example.

In certain embodiments, some or all of the fluid may be used for other purposes, such as pneumatic pressure systems.

In certain embodiments, the centrifugal impeller may be arranged to pressurize fluid, such as gas, to be distributed by a manifold. In an alternative embodiment, the compressor may be arranged to draw a vacuum that pulls fluid, such as gas, through a manifold.

Certain embodiments encompass a device for transferring heat generated during the operation of electrical machines, thereby cooling the electrical machines. In particular, an integral radial centrifugal compressor is directly attached to a high speed electrical shaft providing the necessary pressure and flow of gas to cool the high speed electrical machine. The gas coolant can be air, natural gas, nitrogen, hydrogen, methane, or any other substance in a gaseous form. The centrifugal compressor method of cooling may be utilized to cool components of a high speed electrical machine such as the rotor, stator and bearings. Furthermore, the pressure and gas volume produced by the centrifugal compressor may be directly related to the speed of the machine.

The compressed coolant gas can be directed to the middle of the machine, either end of the machine, or at any location therebetween.

According to a further embodiment, the centrifugal compressor includes a centrifugal impeller and is secured to a shaft directly attached to, or integrally a part of, the rotor of the electric motor. A fluid outflow of the centrifugal compressor is directed to one or more inlets along the length of the electric machine. The fluid outflow then passes through a plurality of openings formed in the stator and is thereafter divided into two separate flows, a first flow traveling along a first axial direction of the electrical machine and a second flow traveling along a second axial direction, opposite the first axial direction. Once divided, the first and second flows pass through the annular gap formed between the outer surface of the rotor and the inner surface of the stator. The first and second flows are then exhausted out of the electrical device through respective first and second outlets. According to one embodiment, the one or more inlets along the length of the electrical machine are substantially centered along the length of the machine, although the scope of the present invention is not so limited, but, rather, the one or more inlets may be located at any point along the length of the machine.

According to a further embodiment, the fluid outflow of the centrifugal compressor is introduced proximate to an end of the electrical machine where the fluid outflow is divided into first and second flows. The first flow may, for example, pass through a plurality of axial passages between an outer surface of the stator and an inner surface of the housing, whereas the second flow may pass through an annular passage, also referred to as annular gap, formed between the outer surface of the rotor and the inner surface of the stator. One or more dampers may be provided in the one or more of the axial passages to adjust the flowrate of the first flow. Therefore, as the damper is made to restrict the first flow, the second flow increases proportionally. Therefore, by adjusting the damper, the flowrate of the second flow may be increased or decreased depending on the cooling needs of the electrical machine. Thereafter, the first and second flows may be recombined and exhausted from the electrical machine.

Further embodiments of the present invention include electrical machines similar to the embodiments described above except that the fluid flow through the respective electrical machines is reversed. That is, the centrifugal impeller is made to pull fluid through the electrical machines as opposed to pushing fluid through the machine. In some instances, the cooling of the electrical machine can be improved.

Some embodiments may provide one or more of following advantages. For example, various embodiments may provide a means to cool portions of an electric machine, including stators, rotors, and bearings. Some embodiments may provide these and other advantages in a simple and relatively inexpensive manner, and with a low profile and a compact form factor, and according to designs that are flexible to adapt to various machine designs and operating conditions. Some embodiments may be used to maintain temperature profiles within a specified temperature range, and may further substantially provide inherent thermal stability of a machine over a wide range of operation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6 is a cross-sectional view of another illustrative embodiment of an electrical machine coupled to a centrifugal impeller;

Like reference symbols in the various drawings indicate like elements.

DETAILED DESCRIPTION

FIGS. 1-7 illustrate various embodiments of an electrical machine having a radial centrifugal impeller attached for cooling one or more components of the machine. According to some embodiments, the electrical machines may be high speed electrical machines, i.e., electrical machines operating in excess of 3,600 RPM.

An electrical machine (referred to interchangeably hereinafter as "machine") generally includes a rotor assembly and a stator. The stator may include a plurality of windings, wound upon a laminated ferromagnetic core, to produce electromotive force when current is applied to the windings. The rotor assembly may typically include a structure of permanent magnets, wound electromagnetic coils, or conducting bars electrically connected at ends thereof. The rotor assembly is rotatable within a stator. The rotor and stator may be separated by an air gap. The rotor is typically contained within a housing surrounding the stator and located at both ends in journal bearings that are fixed within the housing ends. In the generator mode, rotation of the rotor causes the rotor magnetic poles to pass by the stator poles and coils, thereby inducing an electric current to flow in each of the coils. In the motor mode, an electric current is passed through the stator coils, the energized coils causing rotation of the rotor.

Figure 1:
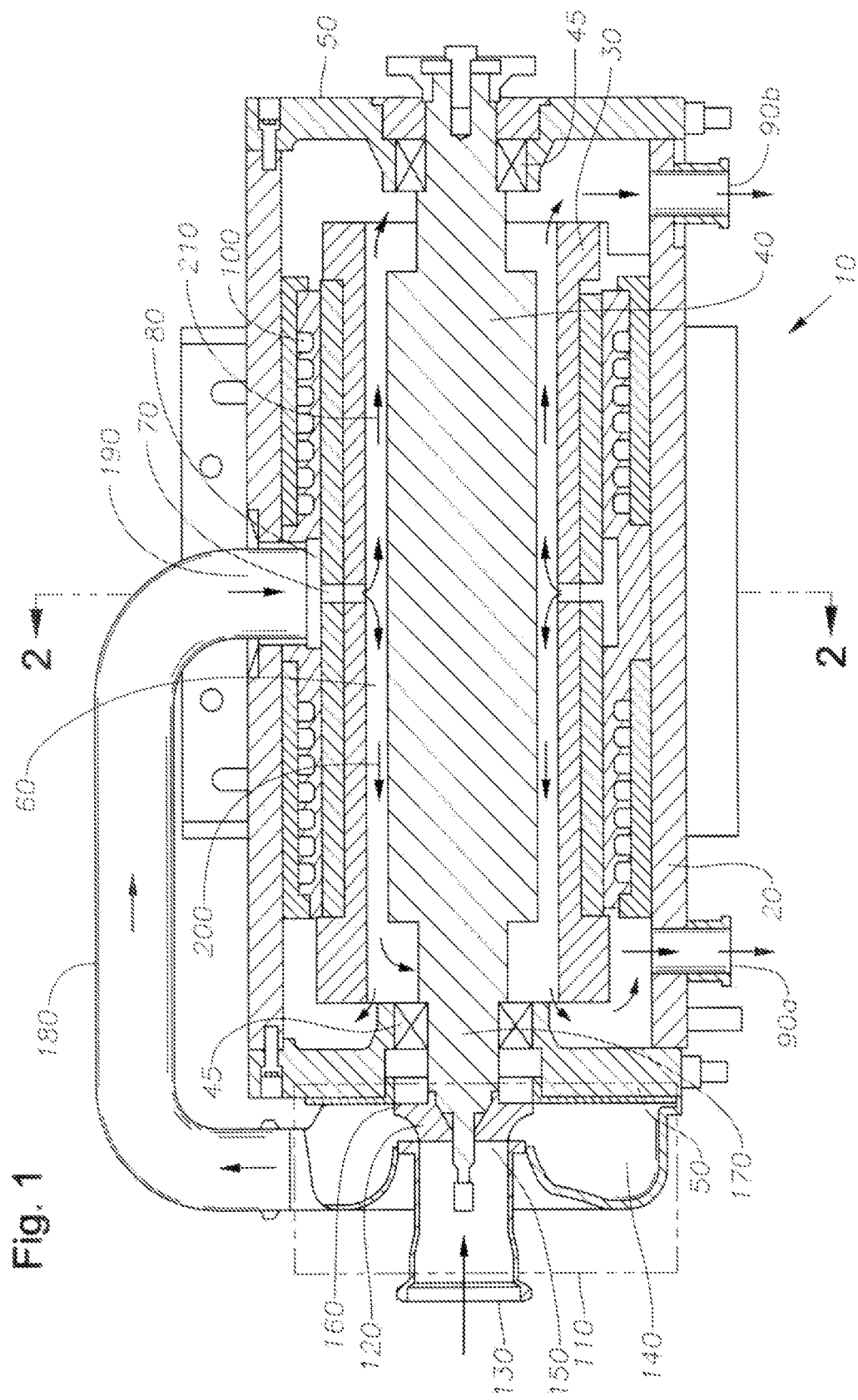
FIG. 1 is a cross-sectional view of an illustrative embodiment of an electrical machine coupled to a centrifugal impeller.

FIG. 1 illustrates an embodiment of an electrical machine, electrical machine 10. The electrical machine 10 is a motor or generator, although the present invention is not so limited, but may be applied to any electrical device having a rotating member. In the embodiment of FIG. 1, the electrical machine 10 includes a housing 20, a stator 30 (sleeved or un-sleeved) disposed within the housing 20, a generally cylindrical rotor assembly 40 mounted for rotation about an axis of rotation within housing 20 and end bells or plates 50 formed at ends of the housing 20. An annular gap between the outer diameter of the rotor assembly 40 and the inner diameter of the stator 30 forms an annular fluid passage 60. The rotor assembly 40 may be supported by bearings 45. Some examples of bearings include magnetic bearings, magnetic hybrid bearings, roller bearings, dynamic bearings, journal bearings, thrust bearings, or any other type of bearings. The rotor assembly 40 may be supported by any combination of bearings or by bearings of uniform type.

Figure 2:
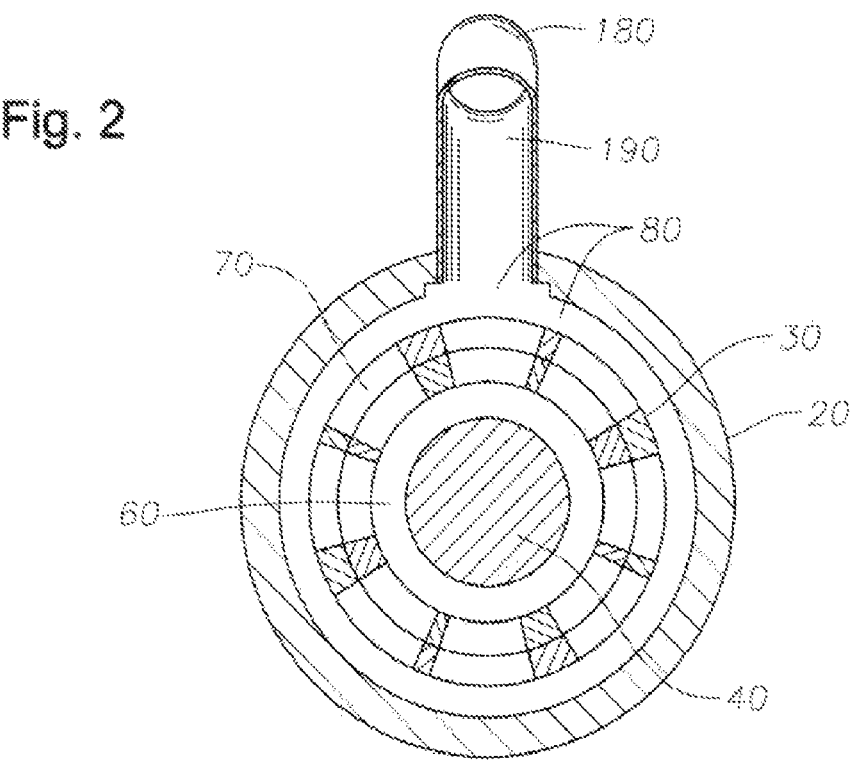
FIG. 2 is a cross-sectional view taken along line 2-2 in FIG. 1.

Referring to FIGS. 1 and 2, the stator 30 includes a plurality of substantially radial openings or slots 70 formed therein providing communication between the annular fluid passage 60 and an annular manifold 80 formed circumferentially around a portion of the outer surface of the stator 30. The housing 20 may also include one or more openings or fluid outlets (identified as 90a and 90b in FIG. 1) open at one end to the exterior of the housing 20 and, at an opposite end, to the interior of the housing 20. The fluid outlets 90a, 90b are in communication with the annular fluid passage 60. Further, the electrical machine 10 may also include annular channels 100 disposed between the housing 20 and the stator 30. A fluid, such as water or any other coolant, flows through the annular channels 100 to cool the stator 30 and, optionally, other portions of the electrical machine 10.

Figure 3:
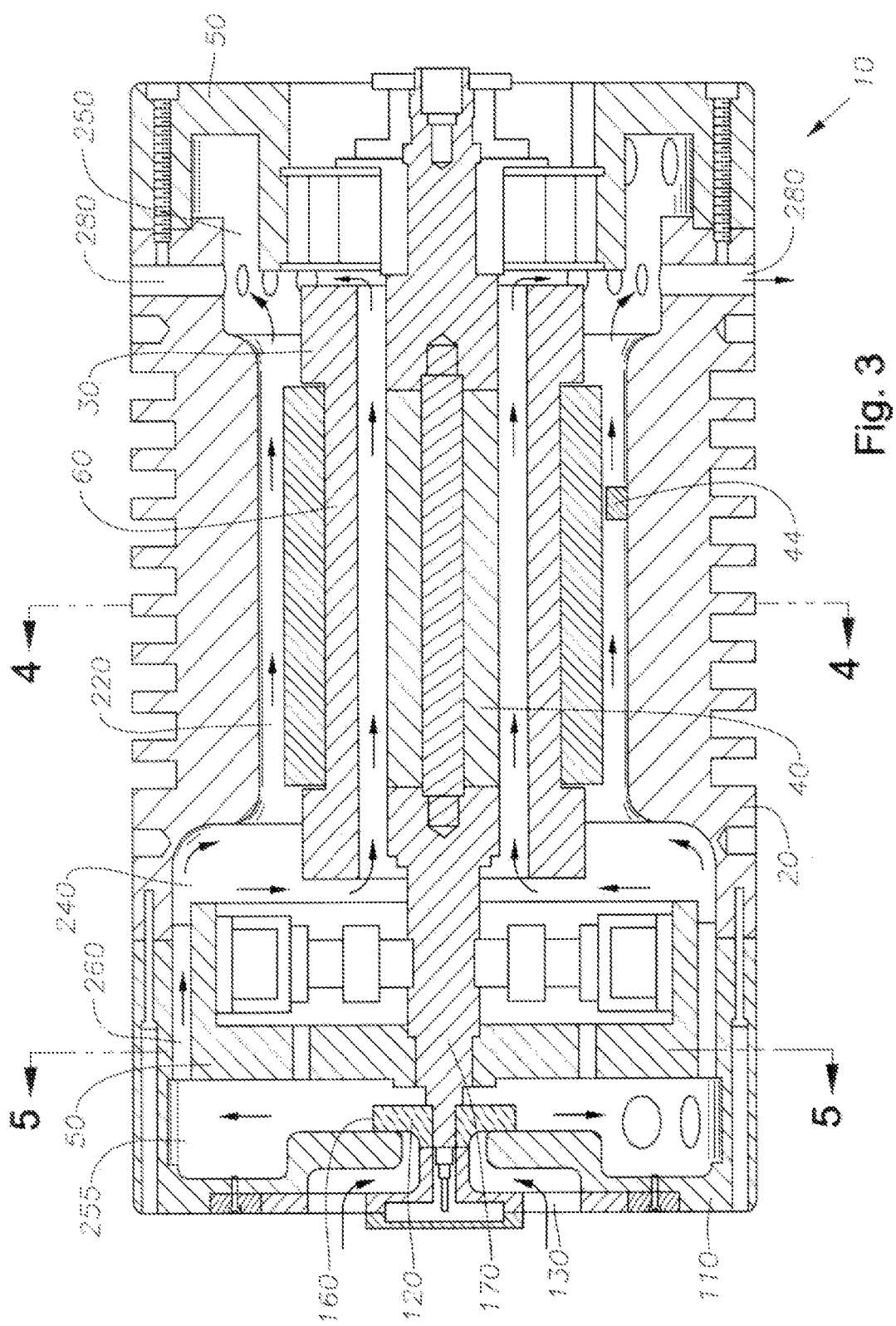
FIG. 3 is a cross-sectional view of another illustrative embodiment of an electrical machine coupled to a centrifugal impeller.

Attached at an end of the electrical machine 10 is a centrifugal impeller assembly 110 including a centrifugal impeller 120, an inlet housing 130, and a plenum housing 140. The inlet housing 130 channels incoming fluid into an inlet end 150 of the impeller 120, while the plenum housing 140 collects fluid exiting an outlet end 160 of the impeller 120 and directs the fluid to a pipe 180. In certain embodiments, the centrifugal impeller 120 is a centrifugal compressor operable to compress incoming fluid from a low pressure at the inlet end 150 of the impeller 120 to a higher pressure at the outlet end 160. Pipe 180 extends between, and is in communication with, the interior of the plenum housing 140 and the annular manifold 80. The centrifugal impeller 120 may be directly or indirectly coupled to the rotor assembly 40. For example, as shown in FIGS. 1 and 3, the centrifugal impeller 120 is directly attached to the rotor assembly 40 via a shaft portion 170 of the rotor assembly 40. The shaft 170 may be a cantilevered shaft, as shown in FIGS. 1 and 3, but the scope of the invention is not so limited. Rather, the shaft 170 may be supported at or near the ends thereof. Further, the impeller 120 may be directly attached to the shaft 170 such as by, for example, press-fitting, threading, integrally formed thereon, a splined connection, a keyed connection, or by any other manner. If directly coupled to the rotor assembly 40, the centrifugal impeller 120 rotates at the same speed as the rotor assembly 40. Alternately, the centrifugal impeller 120 may be indirectly coupled to the rotor assembly 40. For example, a gearbox, flexible coupling, clutch or another device (not shown) may be interposed between the centrifugal impeller 120 and the rotor assembly 40.

In FIG. 1, the shaft 170 is integrally formed to the rotor assembly 40. However, it is within the scope of the present invention that the shaft 170 be a separate element directly attached to the rotor assembly 40 and not integral to the rotor assembly 40. In some instances, the shaft 170 can be indirectly coupled to the rotor assembly 40.

In operation, the rotor assembly 40 spins in relation to the stationary stator 30, which also causes the impeller 120 to spin. Because the impeller 120 may be directly attached to the rotor assembly 40 via the shaft 170, the impeller 120 and rotor assembly 40 rotate in unison. As a result, the impeller 120 draws fluid into the centrifugal impeller assembly 110 through the inlet housing 130 and into the inlet end 150 of the impeller 120. The centrifugal impeller assembly 110 then moves the incoming fluid through the outlet end 160 of the impeller 120 and into the plenum housing 140. The fluid then travels through the pipe 180, through an outlet 190 of the pipe 180, and into the annular manifold 80. Thereafter, the fluid enters the plurality of slots 70 formed in the stator 30. Thereafter, the fluid is separated into two separate flows. Referring to FIG. 1, a first flow, identified by the arrows 200, travels towards a leftward direction (in reference to FIG. 1) through the annular fluid passage 60 and ultimately exhausted through outlet 90a. A second flow, identified by arrows 210, travels towards a rightward direction (in reference to FIG. 1) through the annular fluid passage 60 and ultimately exhausts through outlet 90b. While traveling through the electrical machine 10, the first and second flows 200, 210 absorb heat, thereby cooling the electrical machine 10.

Of note, generally, fluid to flow through an annular gap between the outer diameter of the rotor assembly is driven by a pressure head across the length of the annular gap. Generally, the pressure drop (or the pressure head that is created) across the annular gap is roughly proportional to the length of the annular gap and the mass flow rate of the fluid passing therethrough.

Therefore, as a result of the location of the outlet 190 of pipe 180, the annular manifold 80, and the plurality of slots 70, being intermediate the annular fluid passage 60, the fluid introduced into the annular fluid passage 60 is not required to flow along the entire length of the annular fluid passage 60. Rather, in the embodiment illustrated in FIG. 1, each of the first and second flows 200, 210 flow through only a portion (in FIG. 1, half) of the length of the annular fluid passage 60. Accordingly, the pressure drop across the length of the annular fluid passage 70 is greatly reduced and, therefore, the pressure head that that the centrifugal impeller assembly 110 must generate to move the fluid therealong is similarly reduced. Thus, the centrifugal impeller 120 may be reduced in size and have higher efficiency.

In embodiments where the centrifugal impeller is a centrifugal compressor, the compressor provides an increased pressure ratio (i.e., the pressure existing at the outlet of a centrifugal compressor divided by the pressure existing at the inlet of the centrifugal compressor), as compared to axial fans, axial impeller, or axial compressors, for a given flowrate. In certain embodiments, using a centrifugal compressor enables improvements in cooling efficiency by providing an increased pressure ratio through the electrical machine 10 without increasing the flowrate.

Although FIG. 1 shows the outlet 190 of the pipe 180 and the annular manifold 80 as substantially located in the center of electrical machine's 10 axial length, it is within the scope of the present invention to provide the outlet 190 and annular manifold 80 at any location along the axial length of the electrical machine 10.

Further, it is also within the scope of the invention to direct all or a portion of the fluid to another portion of the electrical machine 10, such as, for example, an exterior surface of the housing 20. Thus, the fluid may provide cooling to other portions of the electrical machine 20.

Figure 4:
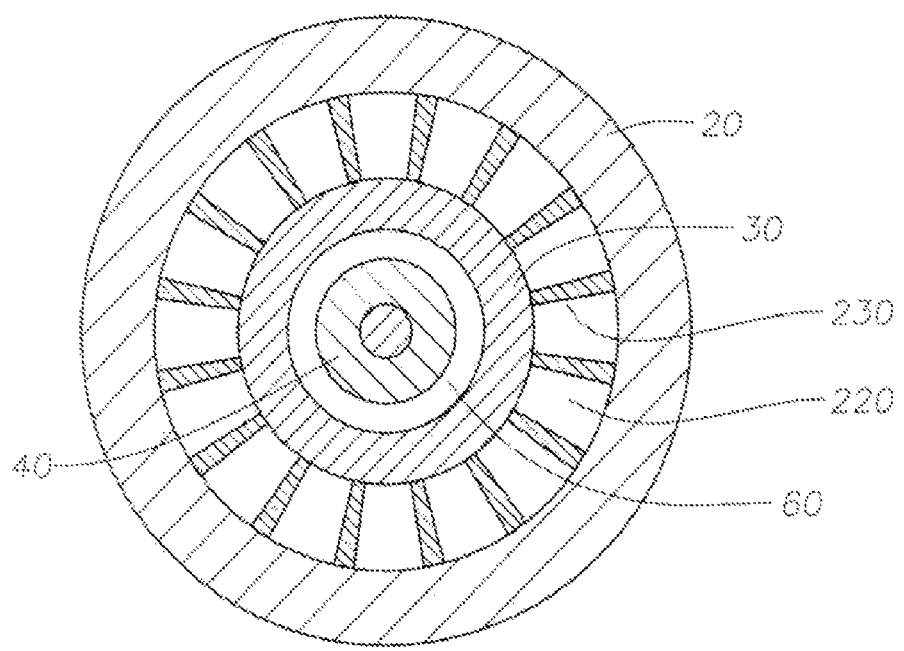
FIG. 4 is a cross-sectional view taken along line 4-4 in FIG. 3.

FIGS. 3 and 4 show an electrical machine 10 according to a further embodiment of the present invention. Similar to the embodiment illustrated in FIG. 1, the electrical machine 10 includes a housing 20, a stator 30 (sleeved or un-sleeved), a generally cylindrical rotor assembly 40 rotatable about an axis of rotation within housing 20, and end plates 50 formed at ends of the housing 20. An annular fluid passage 60 is formed between the outer diameter of the rotor assembly 40 and the inner diameter of the stator 30. A plurality of axial passages 220 are formed between the outer surface of the stator 30 and the inner wall of the housing 20. According to one embodiment, the axial passages 220 may extend an entire length of the stator 30 or only along a portion thereof. Referring to FIG. 4, each axial passage 220 is bounded in a circumferential direction by spokes or fins 230 extending entirely or only a portion of the length of the stator 30. The machine 10 also includes cavities 240 and 250, formed at a opposite ends of the stator 30, to provide communication between the annular fluid passage 60 and the plurality of axial passages 30.

Figure 5:
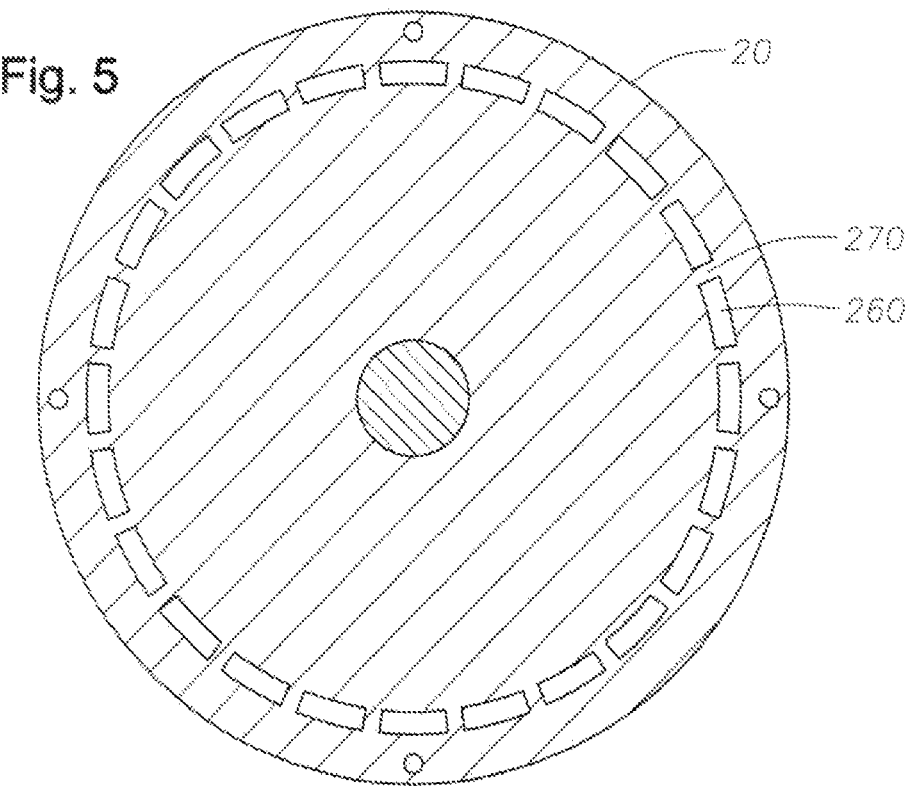
FIG. 5 is a cross-sectional view taken along line 5-5 in FIG. 3.

A centrifugal impeller assembly 110 is attached at an end of the electrical machine and includes a centrifugal impeller 120, an inlet housing 130 at the inlet end 150 of the impeller 120, and a manifold 255 at the outlet end 160 of the impeller 120. The centrifugal impeller assembly 110 moves fluid entering through the inlet housing 130 and discharges the fluid into the manifold 255. The impeller 120 is directly attached to the rotor assembly 40 via a shaft 170 extending from the rotor assembly 40. It is within the scope of the present invention that the shaft 170 be integral with the rotor assembly 40 or a separate component attached to the rotor assembly 40. The manifold 255 is in communication with the cavity 240 via a plurality of channels 260 formed at an inner radius of the housing 20. As shown in FIG. 5, the channels 260 are separated from each other by fins or spokes 270, disposed in a radial fashion, for example.

In a manner similar to that described above, during operation, the rotor assembly 40 and impeller 120 rotate when the stator 30 is energized. As a result, fluid, such as air, hydrogen, vapor, nitrogen, or combinations of these or other fluids, is brought into the centrifugal impeller assembly 110 through the inlet housing 130 where it is then discharged into the manifold 255. The fluid travels from the manifold 255 through the channels 260 and into the cavity 240 where the fluid is divided into a first and second flow. The first flow travels through the axial passages 220 formed around the outer surface of the stator 30. The second flow travels through the annular fluid passage 60. After passing along the length of the stator 30 and rotor assembly 40, the first and second flows recombine in the cavity 250 and are, then, exhausted from the electrical machine 10 through one or more openings 280 formed between the exterior of the electrical machine 10 and the cavity 250. For example, as shown in FIG. 3, the one or more openings 280 comprise a plurality of openings arranged in a radial pattern formed in the housing 20, although the one or more openings 280 may have any number of openings arranged in any pattern.

Additionally, it is also within the scope of the present invention to direct all or a portion of the fluid to another portion of the electrical machine 10, such as, for example, an exterior surface of the housing 20. Thus, the fluid may provide cooling to other portions of the electrical machine 20.

The electrical machine 10 may also include a damper 44 disposed in one or more of the axial passages 220. The damper 44 may be advanced into or retraced from the axial passages 220 so as to increase or decrease the flowrate of fluid passing therethrough. Consequently, as the damper 44 is advanced into the axial passages 220, fluid flowing therethrough is decreased and, as a result, the flowrate of the fluid passing through the annular fluid passage 60 increases. Therefore, advancing or retracting the damper 44 provides a throttling mechanism to adjust the amount of fluid passing through the annular fluid passage 60.

Figure 7:
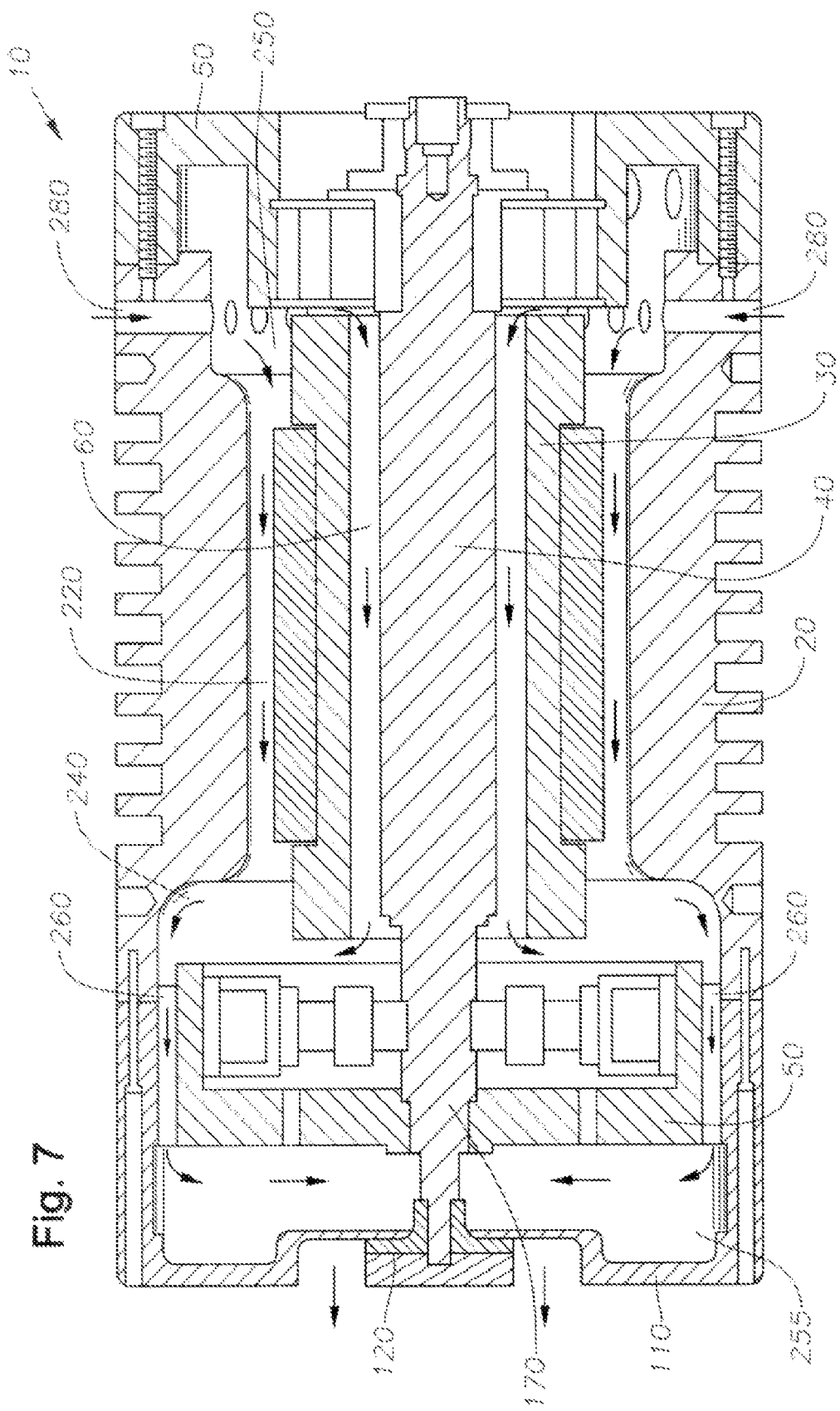
FIG. 7 is a cross-sectional view of another illustrative embodiment of an electrical machine coupled to a centrifugal impeller.

Two additional embodiments depicted in FIGS. 6 and 7 are substantially similar to the embodiments described above and illustrated in FIGS. 1 and 3. However, in these embodiments the direction of fluid flow is reversed so that fluid is pulled through the electrical machine 10. Impeller assemblies tend to increase the temperature of fluid when imparting movement to the fluid. In the embodiments of FIGS. 1 and 3, because the centrifugal impeller assembly 110 is upstream of the electrical machine 10, the fluid temperature is raised prior to the fluid cooling the electrical machine 10. In the embodiments of FIGS. 6 and 7, the centrifugal impeller assembly 110 is downstream of the electrical machine 10. Thus, the centrifugal impeller assembly 110 does not raise the fluid temperature prior to the fluid cooling the electrical machine 10. The result is a lower initial fluid temperature that can increase the heat transfer that occurs between a given volume of fluid and the electrical machine 10.

In the embodiment illustrated in FIG. 6, fluid is drawn into the electrical machine 10 through openings 90a, 90b, passed through the annular fluid passage 60 and the plurality of slots 70, and collected in the manifold 80. The fluid then travels through the pipe 180, the plenum housing 140, and exhausted through the housing 130. In the embodiment shown in FIG. 7, the fluid is drawn through the one or more openings 280 and into the cavity 250. The fluid then separates into a first flow passing through the axial passages 220 and a second flow passing through the annular fluid passage 60. The first and second flows recombine in the cavity 240. The recombined fluid then passes through the plurality of channels 260, the manifold 255, and out through the housing 130.

Additionally, it is also within the scope of the present invention to direct all or a portion of the pressurized fluid to another portion of the electrical machine 10, such as, for example, an exterior surface of the housing 20. Consequently, the fluid may further enhance cooling of the electrical machine 20. Moreover, redirecting the fluid to other portions of the electrical machine 10 is not limited to the embodiments described herein, but may be applied to any embodiment of the present invention.

Figure 8:
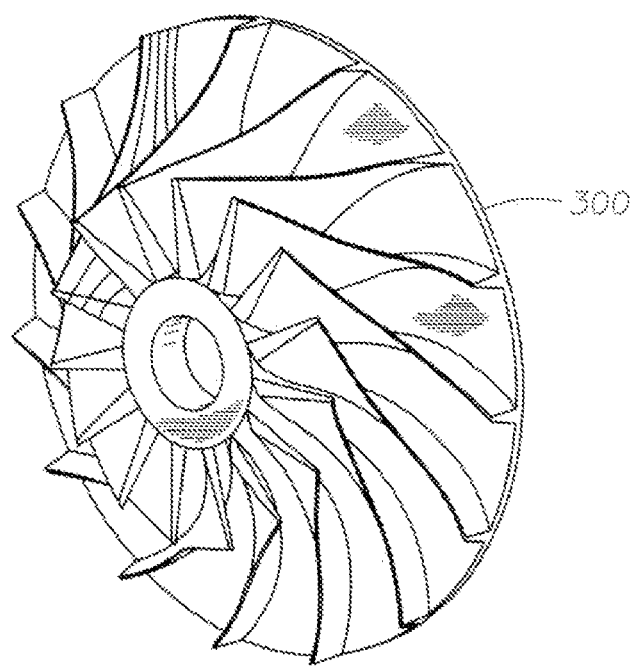
FIG. 8 shows a centrifugal impeller according to an embodiment of the present invention.

FIG. 8 shows an exemplary centrifugal impeller 300. Alternative designs having, for example, an altered shape, fin distribution, fin shape, outer diameter, inner diameter, axial length, etc., may be used, as desired, to provide an optimal pressure head and flow rate for the operating conditions, e.g., air gap size and length, to achieve required cooling at the desired operating speed(s) or range of speeds of the electrical machine. At certain operating conditions in certain applications, such as fixed speed applications, impeller designs may be selected to provide a substantially optimal output, such as flow rate and pressure, for example. Optimal output may take into account, for example, cooling efficiency of a pressurized fluid distribution system, which may be influenced by turbulence or flow resistance in the distribution system. The impeller of the present invention may be formed from, for example, steel, aluminum, magnesium, titanium, ceramic materials, graphite, carbon composite materials, or any other metal or material having properties, such as, for example only, strength, rigidity, creep resistance, dimensional stability, toughness, etc.

In certain applications, the distribution system may be altered to provide improved and/or optimal flow and/or cooling efficiency. Features may be added in the centrifugal compressor intake, for example, such as inlet guides or baffles, which may be manually or automatically adjustable, or replaceable. Features may also be added in some embodiments to adjust the flow path of the output of the centrifugal impeller, including adjustable baffles, or throttle valves. In some embodiments, the inlet air temperature, composition, e.g., mixture of gases, or inlet pressure may be adjusted to adjust the gas flow and/or heat transfer characteristics.

In some embodiments, temperature information may be sensed, such as, for example, using RTD, thermocouples, or optical sensing devices, and monitored at various locations, such as, for example, at the rotor, stator, or the inlet and outlet to determine an inlet-outlet differential, for input to a controller, such as a PLC or embedded processor device. The controller may provide status indication or information, communicate with other devices, for example, over a network, such as a LAN or the Internet, or issue control commands to control adjustment mechanisms, such as those capable of adjusting the flow as described above. The controller may be part of a feedback control system used to regulate one or more parameters, such as, for example, monitored temperatures.

Some embodiments of the present invention may generate pressurized gases using the centrifugal impeller. In certain embodiments, the centrifugal impeller can achieve pressure increases in excess of, for example, 1 atm, including pressures up to 4 atm, for example, as well as pressures between about 2-3 atm, for example.

A number of embodiments of the invention have been described. Nevertheless, it will be understood that various modifications may be made without departing from the spirit and scope of the invention. Accordingly, other embodiments are within the scope of the following claims.

What is claimed is:
1. An apparatus comprising:
an electrical machine comprising:
a first element;
a rotatable element adapted to rotate relative to the first element;
a centrifugal impeller coupled to the rotatable element; and
a conduit adapted to direct a fluid from an outlet of the centrifugal impeller to at least a portion of the electrical machine intermediate a first and second end of the electrical machine, the machine adapted to direct the fluid in substantially opposed directions towards the first and second ends.

2. The apparatus according to claim 1, wherein the centrifugal impeller further comprises a centrifugal compressor.

3. The apparatus according to claim 2, wherein the centrifugal impeller is directly attached to the rotatable element.

4. The apparatus according to claim 1 further comprising:
an annular gap formed between the first element and the rotatable element, wherein the conduit communicates with the annular gap.

5. The apparatus according to claim 4, wherein the first element comprises at least one opening formed therethrough providing communication between the centrifugal impeller and the annular gap.

6. The apparatus according to claim 4, wherein the at least one opening is provided at substantially a middle position along the axial length of the first element.

7. The apparatus according to claim 4 further comprising:
a manifold formed about a portion of the first element and disposed between an end of the conduit and the at least one opening formed in the first member, wherein the manifold is adapted to direct a fluid substantially around a perimeter of the rotatable element.

8. The apparatus according to claim 7, wherein the conduit is adapted to introduce the fluid into the electrical machine in a direction substantially transverse to an axis of rotation of the rotatable element.

9. The apparatus according to claim 1, wherein the conduit is adapted to introduce the fluid axially into an end of the electrical machine.

10. The apparatus according to claim 9 further comprising:
an annular gap formed between the first element and the rotatable element, wherein the conduit communicates with the annular gap.

11. The apparatus according to claim 9 further comprising:
at least one axial channel formed along a perimeter of the first element, wherein the conduit communicates with the at least one axial channel.

12. The apparatus according to claim 1 further comprising a damper to throttle a flow of fluid from the centrifugal impeller.

13. The apparatus according to claim 9, wherein the conduit comprises a plurality of axial channels.

14. The apparatus according to claim 1 further comprising one or more magnetic bearings supporting the rotatable element.

15. An electrical device comprising:
a stator;
a rotor rotatable relative to the stator;
a centrifugal impeller coupled to the rotor;
an annular channel formed between the stator and the rotor adapted to conduct a fluid therethrough; and
a conduit providing communication between the annular channel intermediate opposed ends of the rotor and one of an inlet or an outlet of the centrifugal impeller, the fluid directed towards the opposed ends.

16. The electrical device according to claim 15, wherein the stator comprises one or more openings formed therein and disposed between the conduit and the annular channel.

17. The electrical device according to claim 16, wherein an end portion of the conduit is substantially transverse to the annular channel.

18. The electrical device according to claim 16 further comprising a ring-shaped channel disposed about a perimeter of the stator providing communication between the conduit and the one or more openings formed in the stator.

19. The electrical device according to claim 16, wherein the one or more openings formed in the stator are provided at substantially a middle position along the axial length of the stator.

20. The electrical machine according to claim 15, wherein an opening of the conduit is substantially coaxial with a longitudinal axis of the annular channel.

21. The electrical machine according to claim 15, wherein an end portion of the conduit is substantially parallel with a longitudinal axis of the annular channel.

22. The electrical machine according to claim 15 further comprising at least one longitudinal channel extending along an outer surface of the stator, wherein the at least one longitudinal channel and the conduit are in communication.

23. The electrical machine according to claim 15 further comprising a damper to throttle a flow of the fluid flowing through at least a portion of the electrical machine.

24. The electrical machine according to claim 15, wherein the centrifugal impeller is directly coupled to the rotor.

25. The electrical machine according to claim 15, wherein the centrifugal impeller comprises a centrifugal compressor.

26. The electrical machine according to claim 15, wherein the conduit comprises a plurality of longitudinal channels.

27. The electrical machine according to claim 15 further comprising one or more bearings supporting the rotor.

28. A method for cooling an electrical machine comprising a first element and a rotatable element rotatable relative to the first element, the method comprising:
forming a fluid flow with a centrifugal impeller coupled to the rotatable element of the electrical machine;
conducting at least a portion of the fluid flow from an output of the centrifugal impeller to a location intermediate opposed ends of the rotatable and through an annular gap formed between the first element and the rotatable element; and
conducting the portion of the fluid flow in substantially opposed directions towards the ends of the rotatable element.

29. The method according to claim 28 further comprising:
conducting a first portion of the fluid flow through a first length of the annular gap in a first direction;
conducting a second portion of the fluid flow through a second length of the annular gap in a second direction; and
combining the first and second portions of the fluid flow at one or more openings formed in the first element along a perimeter thereof.

30. The method according to claim 29 further comprising:
conducting the fluid flow through a conduit formed between the one or more openings in the first element and an inlet of the centrifugal impeller.

31. The method according to claim 30 further comprising:
directing the fluid flow through a channel formed around a perimeter of the first element between the one or more openings and the conduit.

32. The method according to claim 28 further comprising:
conducting the fluid flow through a conduit formed between the an end of the annular gap to an inlet of the centrifugal impeller.

33. The method according to claim 32 further comprising:
separating the fluid flow into a first portion and a second portion proximate to a first end of the annular gap;
flowing the first portion of the fluid flow through the annular gap;
flowing the second portion of the fluid flow through at least one channel formed along an outer surface of the first element; and recombining the first and second portions of the fluid flow proximate to an opposite end of the annular gap.

34. The method according to claim 28 further comprising:
conducting the fluid flow from an output of the centrifugal impeller to a location along an axial length of the annular gap;
separating the fluid flow into first and second portions;
conducting the first portion of the fluid flow along a first length of the annular gap; and
conducting the second portion of the fluid flow along a second length of the annular gap.

35. The method according to claim 34 further comprising:
conducting the fluid flow through one or more openings formed in the first element prior to separating the fluid flow into the first and second portions.

36. The method according to claim 28 further comprising:
conducting the fluid flow from an output of the centrifugal impeller to the annular gap; and
conducting at least a portion of the fluid flow through the annular gap.

37. The method according to claim 28 further comprising:
separating the fluid flow into a first and second portion;
conducting the first portion through the annular gap; and
conducting the second portion through at least one channel formed along an outer surface of the first element.

38. The apparatus of claim 1, wherein the centrifugal impeller further comprises an inlet, the inlet being substantially aligned with a rotational axis of the centrifugal impeller and the outlet being substantially perpendicular to the rotational axis.

39. The apparatus of claim 1, wherein the centrifugal impeller further comprises an inlet, the inlet being substantially perpendicular to a rotational axis of the centrifugal impeller and the outlet being substantially aligned with the rotational axis.

40. The electrical device of claim 15, wherein the inlet of the centrifugal impeller is substantially aligned with a rotational axis of the centrifugal impeller and the outlet is substantially perpendicular to the rotational axis.

41. The electrical device of claim 15, wherein the inlet is substantially perpendicular to a rotational axis of the centrifugal impeller and the outlet is substantially aligned with the rotational axis.

42. The method of claim 28, wherein the fluid flow formed by the centrifugal impeller flows from an outlet of the centrifugal impeller substantially in a direction perpendicularly to a rotational axis of the centrifugal impeller.

* * * * *